(12) United States Patent
Buijsen et al.

(10) Patent No.: US 9,096,711 B2
(45) Date of Patent: Aug. 4, 2015

(54) POWDER COATING COMPOSITION COMPRISING A POLYESTER AND A CROSSLINKER WITH OXIRANE GROUPS PROVIDING IMPROVED CORROSION RESISTANCE TO A SUBSTRATE COATED THEREWITH

(75) Inventors: Paulus Franciscus Anna Buijsen, Maassluis (NL); Juul Cuijpers, Zwolle (NL); Marcellinus Hermanus Johannes Schutte, Raalte (NL); Johannes Albertus Hettinga, Zwolle (NL)

(73) Assignee: DSM IP ASSETS B.V., Heerlen (NL)

( * ) Notice: Subject to any disclaimer, the term of this patent is extended or adjusted under 35 U.S.C. 154(b) by 732 days.

(21) Appl. No.: 13/266,530

(22) PCT Filed: Apr. 28, 2010

(86) PCT No.: PCT/EP2010/055719
§ 371 (c)(1),
(2), (4) Date: Jan. 12, 2012

(87) PCT Pub. No.: WO2010/125105
PCT Pub. Date: Nov. 4, 2010

(65) Prior Publication Data
US 2012/0231283 A1    Sep. 13, 2012

(30) Foreign Application Priority Data
Apr. 29, 2009  (EP) ................................. 09159053

(51) Int. Cl.
| | |
|---|---|
| C08G 63/16 | (2006.01) |
| C08G 63/181 | (2006.01) |
| C08G 63/183 | (2006.01) |
| C08G 63/20 | (2006.01) |
| C08G 63/21 | (2006.01) |
| C08G 63/52 | (2006.01) |
| C08K 5/17 | (2006.01) |
| C08K 5/1515 | (2006.01) |
| C08K 5/49 | (2006.01) |
| C08K 5/50 | (2006.01) |
| C08L 67/02 | (2006.01) |
| C08L 67/03 | (2006.01) |
| C08L 67/08 | (2006.01) |
| C09D 5/03 | (2006.01) |
| C09D 167/02 | (2006.01) |
| C09D 167/03 | (2006.01) |
| C09D 167/08 | (2006.01) |
| C08K 5/00 | (2006.01) |
| C08K 5/19 | (2006.01) |

(52) U.S. Cl.
CPC ............... *C08G 63/20* (2013.01); *C08G 63/16* (2013.01); *C08G 63/181* (2013.01); *C08G 63/183* (2013.01); *C08G 63/21* (2013.01); *C08G 63/52* (2013.01); *C08K 5/0025* (2013.01); *C08K 5/1515* (2013.01); *C08K 5/17* (2013.01); *C08K 5/19* (2013.01); *C08K 5/49* (2013.01); *C08K 5/50* (2013.01); *C08L 67/02* (2013.01); *C08L 67/03* (2013.01); *C08L 67/08* (2013.01); *C09D 5/03* (2013.01); *C09D 5/033* (2013.01); *C09D 167/02* (2013.01); *C09D 167/03* (2013.01); *C09D 167/08* (2013.01)

(58) Field of Classification Search
None
See application file for complete search history.

(56) References Cited

U.S. PATENT DOCUMENTS

| | | | | |
|---|---|---|---|---|
| 4,463,140 A | * | 7/1984 | Belder et al. | 525/438 |
| 4,528,341 A | * | 7/1985 | Belder et al. | 525/438 |
| 4,742,096 A | * | 5/1988 | Craun | 523/400 |
| 5,006,612 A | * | 4/1991 | Danick et al. | 525/438 |
| 5,043,401 A | * | 8/1991 | Matsuzaki | 525/438 |

(Continued)

FOREIGN PATENT DOCUMENTS

| | | |
|---|---|---|
| CN | 1962717 A | 5/2007 |
| JP | 2000-239568 | 9/2000 |

(Continued)

OTHER PUBLICATIONS

International Search Report for PCT/EP2010/055719, mailed Aug. 3, 2010.

(Continued)

*Primary Examiner* — Vivian Chen
(74) *Attorney, Agent, or Firm* — Nixon & Vanderhye P.C.

(57) ABSTRACT

The invention relates to a carboxylic acid functional branched polyester for thermosetting powder coating composition, wherein said polyester is prepared from at least the following monomers: a difunctional aromatic acid, the difunctional aromatic acid being a combination of terephthalic acid (TPA), isophthalic acid (IPA), an at least trifunctional monomer and a difunctional alcohol, the difunctional alcohol being a combination of at least ethylene glycol (EG) and/or diethylene glycol (DEG) and neopentyl glycol (NPG), the molar ratio of TPA to IPA in the carboxylic acid functional branched polyester is at most 12.4, and the functionality of the carboxylic acid functional branched polyester is from 2.15 to 4.0, and the carboxylic acid functional branched polyester has an acid value of from 14 to 80 mg KOH/g resin, and the carboxylic acid functional branched polyester has a glass transition temperature of at least 40C. The powder coating compositions of the present invention derived upon curing of the thermosetting powder coating compositions which comprise the polyester according to the invention together with a crosslinker with oxirane groups and an epoxy cure catalyst present good corrosion resistance to steel substrates. Furthermore, said low cost and corrosion resistant powder coatings may present good reverse impact resistance (RIR) and/or good smoothness.

61 Claims, No Drawings

(56) References Cited

U.S. PATENT DOCUMENTS

| | | | | |
|---|---|---|---|---|
| 5,168,110 | A | * | 12/1992 | Van Den Elshout et al. .. 525/438 |
| 5,741,602 | A | * | 4/1998 | Hoppe et al. .................. 428/482 |
| 5,994,462 | A | * | 11/1999 | Srinivasan et al. .............. 525/65 |
| 6,153,264 | A | * | 11/2000 | Schmid et al. ................ 427/318 |
| 6,184,311 | B1 | * | 2/2001 | O'Keeffe et al. ............. 525/438 |
| 6,284,845 | B1 | * | 9/2001 | Panandiker et al. .......... 525/438 |
| 6,534,178 | B2 | * | 3/2003 | Zhou et al. .................... 428/413 |
| 6,537,620 | B1 | * | 3/2003 | Thiele et al. .................. 427/521 |
| 6,599,993 | B1 | * | 7/2003 | Norris et al. .................. 525/438 |
| 6,905,778 | B2 | * | 6/2005 | Tullos et al. .................. 428/480 |
| 8,357,749 | B2 | * | 1/2013 | Malotky et al. ............... 524/523 |
| 2002/0061963 | A1 | * | 5/2002 | Thames et al. .................. 525/30 |
| 2003/0100678 | A1 | * | 5/2003 | Nicholl et al. ................ 525/166 |
| 2003/0134978 | A1 | * | 7/2003 | Tullos et al. .................. 525/165 |
| 2006/0217520 | A1 | * | 9/2006 | Moens et al. ................. 528/272 |
| 2007/0141356 | A1 | * | 6/2007 | Fugier et al. .................. 428/413 |

FOREIGN PATENT DOCUMENTS

| | | | |
|---|---|---|---|
| JP | 2001-106774 | * | 4/2001 |
| WO | WO 89/11497 | | 11/1989 |
| WO | WO 00/23540 | * | 4/2000 |
| WO | WO 2004/069896 | * | 8/2004 |

OTHER PUBLICATIONS

International Preliminary Report on Patentability for PCT/EP2010/055719, dated Nov. 22, 2010. (3 pages).

Database CA [Online], "Polyesters for powder coatings having good blocking-resistance and smoothness", Database Accession No. 2001:269344 & JP 2001-106774 (Apr. 17, 2001).

Database CA [Online], "Polyester-based powder coatings with good weather resistance and coat film strengths", Database Accession No. 2000:616756 7 JP 2000-239568 (Sep. 5, 2000).

* cited by examiner

POWDER COATING COMPOSITION COMPRISING A POLYESTER AND A CROSSLINKER WITH OXIRANE GROUPS PROVIDING IMPROVED CORROSION RESISTANCE TO A SUBSTRATE COATED THEREWITH

This application is the U.S. national phase of International Application No. PCT/EP2010/055719, filed 28 Apr. 2010, which designated the U.S. and claims priority to EP Application No. 09159053.9, filed 29 Apr. 2009, the entire contents of each of which are hereby incorporated by reference.

The invention relates to a polyester, thermosetting powder coating compositions comprising the polyester and a crosslinker with oxirane groups, powder coatings prepared from said compositions, a substrate coated with said powder coatings and to the use of the polyester or of the compositions to provide improved corrosion resistance to a metal substrate coated therewith.

Powder coating compositions comprising a polyester and a crosslinker with oxirane groups are well known in the art and are used in a variety of markets such as (metal) furniture, oil and gas, power, industrial and infrastructure, etc. Low cost, good corrosion resistance and good appearance are generally desirable for this type of coatings and applications.

According to WO 03082996A2, in the coating industry there is a growing interest in the use of cheaper film-forming materials. A possible cheaper alternative makes use of polyester resins comprising polyhydric alcohols, for example ethylene glycol. The use of high amounts of cheaper polyhydric alcohols such as for example ethylene glycol is directly associated to "low cost". However it is commonly known that polyesters that are mainly based on ethylene glycol as the polyhydric alcohol, are very susceptible to cratering, formation of fish-eyes and pinholes. This is generally referred to as "surface defects" (the terms of cratering, fish-eyes and pinholing are explained herein after).

In case of thermosetting powder coating compositions comprising a polyester and a crosslinker with oxirane groups, there is an additional problem. The corrosion resistance of this type of powder coatings is adversely affected by the presence of typical agents (epoxy cure catalysts) used to promote the curing between the polyester and the crosslinker with oxirane groups. More particularly, the speed of cure of the polyester with the crosslinker in this type of thermosetting powder coating compositions can be controlled by varying the amount and type of the epoxy cure catalyst. Upon curing of this type of powder coating composition, the epoxy cure catalyst remains in the powder coating. Unfortunately, the presence of such epoxy cure catalyst decreases the amount of corrosion resistance provided by the powder coating to a metal substrate, for example to a steel substrate. The presence of such epoxy cure catalyst decreases the amount of corrosion resistance, especially the case, when the amount of epoxy cure catalyst is higher than 0.3% w/w for example higher than 0.5% w/w based on the polyester and/or when the epoxy cure catalyst is a quaternary ammonium salt or a quaternary phosphonium salt, both of which are the most commonly used epoxy cure catalysts.

Therefore, when high amounts of cheaper polyhydric alcohols such as for example ethylene glycol, diethylene glycol are used in the preparation of polyester resins and wherein the latter are combined with epoxy cure catalysts in a thermosetting powder coating composition, the powder coatings derived upon curing of these thermosetting powder coating composition suffer from at least bad appearance and decreased corrosion resistance on metal substrates, especially in fast or low temperature curable thermosetting powder coating compositions wherein relatively high amounts of epoxy cure catalyst are necessary.

It is therefore the object of the invention to provide low cost powder coatings comprising a polyester and a crosslinker having oxirane groups and preferably also comprising an epoxy cure catalyst, said powder coatings having good corrosion resistance to metal substrates and/or good appearance and/or sufficient reverse impact resistance and/or good smoothness.

This object is achieved by a carboxylic acid functional branched polyester for thermosetting powder coating composition, wherein the carboxylic acid functional branched polyester is prepared from at least the following monomers: a difunctional aromatic acid, the difunctional aromatic acid being a combination of terephthalic acid (TPA), isophthalic acid (IPA), an at least trifunctional monomer and a difunctional alcohol, the difunctional alcohol being a combination of at least ethylene glycol (EG) and/or diethylene glycol (DEG) and neopentyl glycol (NPG), the molar ratio of TPA to IPA in the carboxylic acid functional branched polyester is at most 12.4, and the functionality of the carboxylic acid functional branched polyester is from 2.15 to 4.0, and the carboxylic acid functional branched polyester has an acid value of from 14 to 80 mg KOH/g carboxylic acid functional branched polyester, and the carboxylic acid functional branched polyester has a glass transition temperature of at least 40° C.

The carboxylic acid functional branched polyester of the present invention when used in thermosetting powder coating compositions together with a crosslinker having oxirane groups and optionally an epoxy cure catalyst (in an amount of at least 0.3% w/w based on the polyester) and upon curing of said thermosetting powder coating compositions, affords low cost powder coatings which present enhanced corrosion resistance to steel substrates and in particular cold roll steel as well as at least either a good appearance and/or sufficient impact resistance. Furthermore, said low cost and corrosion resistant powder coatings may also present good smoothness. The polyesters, the thermosetting powder coating compositions and the powder coatings of the present invention may also be more cost-effective or commercially attractive.

Furthermore, thermosetting powder coating compositions comprising the polyester of the invention may be of particular advantage when used on non-surface pretreated steel, as they may also provide enhanced corrosion resistance to untreated surfaces. Coating untreated metal substrates has significant advantages since the omission of expensive and multi-step surface pretreatment of metal substrates such as steel that has a significant impact on the cost of a finished coated article. In addition, the use of such thermosetting powder coating compositions can also contribute to reducing the energy and carbon footprint since metal surface pretreatment is an energy consuming process. Moreover, such thermosetting powder coating compositions offer to manufacturers of metal coated articles to possibility to increase productivity and throughput of their coating lines, thus directly establishing a more cost-effective and commercially attractive solution together with a "green" character attached to it.

In the context of the present invention with carboxylic acid functional polyester is meant a polyester which predominantly has carboxylic acid end groups.

The carboxylic acid functional polyester a polyester having an acid value that is higher than its hydroxyl value. Generally, a carboxylic acid functional polyester has an acid value between 14 and 120 mg KOH/g polyester whilst the hydroxyl value of the polyester is less than 10 mg KOH/g polyester. The acid (AV) and hydroxyl value (OHV) of a polyester can be measured titrimetrically according to ISO 2114-2000 and ISO 4629-1978, respectively. A carboxylic acid functional polyester may be prepared by selecting the synthesis conditions and the ratio of alcohols and carboxylic acids or anhydrides such that there is an excess of carboxylic acid or anhydride over alcohol (so as) to form a polyester which has terminal carboxylic acid and/or carboxylic acid anhydride groups.

With 'branched' is meant that the polyester has a functionality of more than 2.0.

Cure is used interchangeably with the terms crosslinking or curing in the present invention while powder coating is the object derived upon cure of the thermosetting powder coating composition of the present invention. By "curing" is meant herein the process of becoming "set" material. Preferably, curing of the thermosetting powder coating composition takes place using thermal energy only. For clarity, in the context of the invention, the term thermal energy does not include UV- or electron beam induced curing. Thermal energy cure is used interchangeably with the term heat cure or thermal cure.

In the context of the present invention, with 'thermosetting powder coating composition' is meant a mixture of components that form a powder-like material which mixture is solid or semi-solid at room temperature and which mixture has the ability to form an irreversibly crosslinked network (the so-called 'cured form'). In the thermosetting powder coating composition of the present invention, crosslinking will proceed via the formation of permanent covalent bonds through chemical reactions between functional groups of the polyester having functional groups that are capable of reacting with oxirane groups and the crosslinker (commonly also referred to as curing agent or curative), which is a compound having oxirane groups. If other resins should also be present in the thermosetting powder coating composition of the present invention, their functional groups—if capable of reacting with oxirane groups—may also react with the crosslinker. As a result of these crosslinking reactions, the cured form of the thermosetting powder coating composition (crosslinked thermosetting powder coating composition) becomes "set" material, that is, a material that can no longer flow or be molten.

By "powder" is meant herein, a collection of solid particles wherein the individual particles have a maximum particle size of at most 130 μm at 23° C., for example a particle size of at most 110 μm, for example of at most 90 μm at 23° C.

The term 'powder coating' as used herein is the partially or fully cured (crosslinked) form of the thermosetting powder coating composition of the invention. In other words the powder coating derives upon partial or full cure of the thermosetting powder coating composition.

The functional groups of the polyester that are capable of reacting with oxirane groups, are terminal groups (=end-groups) which are located at the end(s) of the polyester's macromolecular structure (including terminal groups on side chains which side chains form part of the main and longer—when compared to side chains-macromolecular chain) of each polyester molecule. In case of a carboxylic acid functional polyester, the functional groups of the polyester that are capable of reacting with oxirane groups are carboxylic acid or carboxylic acid anhydride terminal groups.

In the context of the present invention, the carboxylic acid functional branched polyester that is capable of reacting with a crosslinker having oxirane groups, is referred to as 'the polyester'.

The use of high amounts of cheaper polyhydric alcohols such as for example ethylene glycol (EG) or diethylene glycol (DEG) is directly associated to "low cost". More specifically, the amount of cheaper polyhydric alcohols is more than 1 mol % more preferably is higher than 5 mol %, more preferably is higher than 10 mol % for example is higher than 11 mol % based on the total amount of difunctional alcohols used for the preparation of the polyester of the invention.

In the context of the present invention, powder coatings that are characterized as having good appearance are those powder coatings that present no surface defects such as cratering, pinholing, fish-eyes. Cratering is here and hereinafter meant the formation of a bowl-shaped depression in a paint or varnish. With fish-eyes is here and hereinafter meant a defect in a paint that manifests itself by the crawling of viscous paint into a recognized pattern resembling small dimples or "fish-eyes". With pinhole is here and hereinafter meant a film defect characterized by small pore-like flaws in a coating, which extend entirely through the applied film and have the general appearance of pinpricks when viewed by reflected light. The inspection of the surfaces of the powder coatings is done visually.

In literature, the term smoothness is also referred to as flow. The smoothness of the powder coatings derived upon full cure of the corresponding thermosetting powder coating compositions of the present invention was determined by comparing the smoothness of the coating with PCI Powder Coating Smoothness panels (ACT Test Panels Inc., APR22163 (A) Batch: 50708816) at a thickness of approximately 60 μm. The rating of smoothness is from 1 to 10, with 1 representing the roughest coating and 10 representing the smoothest coating. For the thermosetting powder coating compositions of the invention, their corresponding powder coatings presenting smoothness equal or higher to 3, are desirable. As presented herein, acceptable smoothness of a powder coating is a smoothness of at least PCI 3, preferably of at least PCI 4.

Reverse impact resistance (RIR) (inch/lbs, 1 inch/lbs=0.055997 m/kg) of the powder coatings of the present invention was tested according to ASTM D 2794, with a ⅝" ball, 1 day after the curing (180° C. for 20 minutes) of the corresponding thermosetting powder coating composition took place and at a film thickness of 60 μm or 75 μm. With sufficient reverse impact resistance of a powder coating is meant that the powder coatings prepared from the thermosetting powder coating composition of the present invention when cured at 180° C. for 20 minutes withstands a reverse impact of 160 inch/lbs without been delaminated or cracked (for details see RIR test as described in the experimental section).

Corrosion is the disintegration of a material into its constituent atoms due to chemical reactions with its surroundings. Corrosion is an electrochemical process which leads to the breaking down of essential properties in a material due to electrochemical reactions with its surroundings and typically occurs on exposed surfaces. This type of damage usually affects metallic materials and typically produces oxides and/or salts of the original metal. Methods to reduce the activity of the exposed surface, such as passivation and chromate-conversion, can increase a metal's corrosion resistance. In the context of the invention, with corrosion resistance is meant the ability to withstand corrosion. By coating of the metallic material (the substrate), the substrate can be protected from electrochemical reactions with its surroundings, thus leading to less deterioration of the substrate and thus a longer lifetime of the substrate. A coating provides a barrier of corrosion-resistant material between the damaging environment and the substrate. Corrosion resistance of a coated substrate may be measured using the neutral salt spray test according to ISO 9227-2006, for example as described in the experimental section below. In the context of the present invention corrosion resistance is assessed and should be assessed using as reference a metal susbtrate, cold roll steel which is widely known to be untreated steel, that is steel that has not undergone a surface pretreatment to enhance its corrosion resistance.

The powder coatings of the present invention have good corrosion resistance on metal substrates if they present average creepage less than 7 mm, more preferably less than 6 mm, even more preferably less than 5 mm, most preferably less than 4 mm, for example less than 3 mm, for example less than 2.2 mm, for example less than 1.6 mm from scribe, when subjected for 480 hours to the neutral salt spray (NSS) test according to ISO 9227-2006. More details of the assessment of the corrosion resistance are given in the Examples. The corrosion resistance assessment carried out on cold roll steel substrates according to the NSS test described in ISO 9227-2006, should not be confused or compared to NSS data derived from coated steel substrates wherein steel was subjected to a surface pretreatment in order to enhance its corrosion resistance. Zinc phosphate treated steel substrates are typical examples of steel substrates with enhanced corrosion resistance due to the surface pretreatment of steel with zinc phosphate(s). Typically, NSS data (average creepage from scribe) derived from untreated steel surfaces are higher than NSS data derived from corrosion enhanced surface treated steel substrates.

In the context of the present invention as surface pretreatment of a metal substrate is meant only any coating or treatment that reacts with the substrate and becomes integrated with it. It is a film produced by chemical or electrochemical modification of the metal surface so that the coating formed is an integral part of the surface. It should be pointed out that all effective pretreatment processes begin with rigorous cleaning, usually with an alkaline solution. Cleaning is critical for the formation of a high quality pretreatment. For clarity, in the context of the present invention, typical cleaning e.g. degreasing of a metal surface, is not considered as pretreatment of the metal surface. A good metal surface pretreatment pasivates the metal/metal oxide surface, thereby preventing or reducing the rate of electrochemical corrosion reactions. It also seals the metal surface, provides a wettable, uniformly rough surface for mechanical adhesion and keeps water (humidity) away from the interface between the metal and the organic coating. Water at an interface leads to loss of adhesion and/or corrosion. The most common type of pretreatment is a metal phosphate. An aqueous phosphoric acid solution (with or without metal ions) is applied to the metal surface by immersion or spray. An electrochemical process causes dissolution of some of the metal, which forms a soluble phosphate salt. Increasing pH at the metal-solution interface due to another product of the electrochemistryelectrochemistry, science dealing with the relationship between electricity and chemical changes. A simple treatment commonly used for steel under industrial coatings is amorphous iron phosphate produced by exposure to phosphoric acid. For more demanding applications, such as automotive, the choice is zinc phosphate. The electrochemical process is as above, but with zinc ion in the phosphoric acid solution. The main product is crystalline zinc phosphate, although zinc-iron phosphate crystals also are produced. Most pretreatment baths now contain other dissolved bivalent (carrying a valence of two) ions besides zinc, so a pretreatment may include $(Zn_2)Mn(PO4)_2$, $(Zn_2)Ni(PO4)_2$ or $ZnMnNi(PO4)_2$. The size, shape, and structure of the phosphate crystals depend on bath conditions and whether the process is dip or spray. Although zinc phosphates can be thought of as coatings, they are somewhat porous, which enables corrosion inhibitors to reach the metal surface and, in the case of electrocoats, allows the electrodeposition process to occur. The zinc phosphating process includes a final sealing rinse that coats any bare substrate and removes loose, amorphous and poor quality phosphate. Historically, these rinses have been chromium-based, but a number of non-chrome rinses are available, some of which give performance approaching that of chrome rinses. In addition to zinc phosphates, pretreatments for aluminum and aluminum alloys include chrome phosphate, any salt of chromic acid, chrome chromate (gold chromate), other chromate treatments, and anodizing. Non-chrome polymer/halogen acid pretreatments have been developed and are increasing their share of the market. They give comparable performance to chromate treatments and newer versions should be even better. For both performance and environmental reasons, they will supplant chromate-based products.

For all upper and lower boundaries of any parameters given herein, the boundary value is included in each range for each parameter. All combinations of minimum and maximum values of the parameters described herein may be used to define the parameter ranges for various embodiments and preferences of the invention.

Polyesters suitable for use in the thermosetting powder coating composition of the present invention may for example be based on a condensation reaction between alcohol functional monomers and carboxylic acid functional monomers. The polyester may be prepared according to conventional procedures by esterification or transesterification, optionally in the presence of customary esterification catalysts for example dibutyltin oxide or tetrabutyl titanate. The preparation conditions and the COOH/OH ratio may be selected so as to obtain end products that have an acid number and/or a hydroxyl number within the targeted range of values.

The polyester of the invention is prepared from at least the following monomers: a difunctional aromatic wherein the difunctional aromatic acid is a combination of terephthalic acid (TPA) and isophthalic acid (IPA) optionally a fatty acid and/or its corresponding anhydride, an at least trifunctional monomer, a difunctional alcohol, wherein the difunctional alcohol is a combination of at least ethylene glycol and/or diethylene glycol and neopentyl glycol. For clarity it is added that the total amount of monomers from which the polyester is prepared adds up to 100 mol %. Preferably, the sum of the amount of the difunctional aromatic acid and/or its corresponding anhydride, the fatty acid and/or its corresponding anhydride, the at least trifunctional monomer and the combination of ethylene glycol and neopentyl glycol or of diethylene glycol and neopentyl glycol or of ethylene glycol, diethylene glycol and neopentyl glycol is at least 90 mol %, more preferably at least 95 mol %, for example at least 97 mol %, for example 100 mol %.

Examples of carboxylic acid functional monomers suitable for use in the polyester include for example 2,6-naphthalene dicarboxylic acid, 4,4'-oxybisbenzoic acid, tetrahydro phthalic acid, trimellitic acid, pyromellitic acid, hexahydro terephthalic acid (cyclohexane dicarboxylic acid), phthalic acid, azelaic acid, sebacic acid, decane dicarboxylic acid, adipic acid, succinic acid, maleic acid and fumaric acid. These carboxylic acid functional monomers may be used as such, or, in so far as available as their anhydrides, acid chlorides or lower alkyl esters. Preferably, the carboxylic acid functional monomers are carboxylic acids.

Also monocarboxylic aromatic acids such as for example benzoic acid, tert.-butyl benzoic acid or hexahydrobenzoic acid may be used in the preparation of the polyester.

The polyester of the invention is prepared from at least a difunctional aromatic acid. The difunctional aromatic acid is preferably chosen from the group of isophthalic acid, terephthalic acid and a combination thereof. More preferably, the difunctional aromatic acid is terephthalic acid as this will increase the impact resistance of the powder coating resulting from a powder coating composition comprising the polyester.

Preferably, the polyester of the invention is prepared from terephthalic acid (TPA) and isophthalic acid (IPA). The molar ratio of TPA to IPA is not more than 12.4. More preferably the molar ratio of TPA to IPA is lower than 12, most preferably lower than 11.5, for example lower than 11, for example lower than 10.5, for example lower than 10, for example lower than 9.5, for example lower than 9, for example lower than 9, for example lower than 8.5, for example lower than 8, for example lower than 7.5, for example lower than 7. Preferably the molar ratio of TPA to IPA is higher than 0.1, more preferably is higher than 0.2, even more preferably is higher than 0.3, most preferably is higher than 0.5, for example is higher than 0.7, for example is higher than 1, more preferably higher than 2, even more preferably higher than 3, most preferably lower than 4, for example higher than 4.5, for example higher than 5, for example higher than 5.5, for example higher than 5.60, for example higher than 5.62.

The amount of terephthalic acid is preferably from 30 to 50 mol %. For instance, the amount of terephthalic acid is preferably at least 25, more preferably at least 35 mol %. More preferably, the amount of terephthalic acid is at most 45 mol %. The amount of isophthalic acid is preferably from 0 to 15 mol %. Preferably, the amount of isophthalic acid is at least 1 mol %. However, it is also possible that the isophthalic acid monomer in the polyester is completely replaced by another monomer, for example by adipic acid. In case isophthalic acid is used in the preparation of the polyester according to the invention, preferably, the % molar ratio in the polyester of terephthalic acid to isophthalic acid is for example from 3:1 to 10:1.

The polyester of the invention is optionally prepared from at least a fatty acid. The amount of fatty acid which is used for the preparation of the polyester is for example from 0.5 to 5 mol %, preferably the amount of fatty acid is not more than 3.0 mol %, for example not more than 2.0 mol %, for example not more than 1.8 mol % based on the polyester of the invention. Preferably the amount of fatty acid is more than 0.5 mol %, for example more than 0.7 mol %, for example more than 0.9 mol %, for example more than 1 mol % based on the polyester of the invention.

Fatty acids are a class of lipids. Lipids are a broad group of naturally-occurring molecules which includes fats, fatty acids, oils, waxes, sterols, fat-soluble vitamins (such as vitamins A, D, E and K), monoglycerides, diglycerides, phospholipids, glycolipids and others.

A fatty acid is a carboxylic acid often with a long unbranched aliphatic tail (chain), which can be either saturated or unsaturated. Carboxylic acids as short as butyric acid (4 carbon atoms) are considered to be fatty acids, whereas fatty acids derived from natural fats and oils may be assumed to have at least eight carbon atoms, caprylic acid (octanoic acid). The most abundant natural fatty acids have an even number of carbon atoms because their biosynthesis involves acetyl-CoA, a coenzyme carrying a two-carbon-atom group. Fatty acids are produced by the hydrolysis of the ester linkages in a fat or biological oil (both of which are triglycerides), with the removal of glycerol. Fatty acids are aliphatic monocarboxylic acids derived from, or contained in esterified form in an animal or vegetable fat, oil, or wax. Natural fatty acids commonly have a chain of 4 to 28 carbons (usually unbranched and even numbered).

In addition to saturation, fatty acids are short, medium, or long. Short chain fatty acids (SCFA) are fatty acids with fewer than 6 carbons in their chemical structure. Medium chain fatty acids (MCFA) are fatty acids with 6-12 carbons in their chemical structure, which can form medium chain triglycerides. Long chain fatty acids (LCFA) are fatty acids with more 12-21 carbons in their chemical structures. Very long chain fatty acids (VLCFA) are fatty acids with more than 22 carbons in their chemical structures. In the present invention, the fatty acids have preferably at least 6 carbons in their chemical structure, more preferably have at least 8 carbon atoms, even more preferably have at least 10 carbon atoms, most preferably have at least 12 carbon atoms, for example have at least 14 carbon atoms in their chemical structure. In the present invention, the fatty acids have preferably at most 100 carbons in their chemical structure, more preferably have at most 80 carbon atoms, even more preferably have at most 60 carbon atoms, most preferably have at most 40 carbon atoms, for example have at most 36 carbon atoms, for example have at most 30 carbon atoms in their chemical structure.

Exemplary fatty acids include but are not limited to, myristoleic acid $[CH_3(CH_2)_3CH=CH(CH_2)_7COOH]$, palmitoleic acid $[CH_3(CH_2)_5CH=CH(CH_2)_7COOH]$, oleic acid $[CH_3(CH_2)_7CH=CH(CH_2)_7COOH]$, linoleic acid $[CH_3(CH_2)_4CH=CHCH_2CH=CH(CH_2)_7COOH]$, linolenic acid $[CH_3CH_2CH=CHCH_2CH=CHCH_2CH=CH(CH_2)_7COOH]$, pinolenic acid $[CH_3(CH_2)_4CH=CHCH_2CH=CHCH_2CH_2CH=CH(CH_2)_3COOH]$, palmitic acid $[CH_3(CH_2)_{14}COOH]$, oleic acid $[CH_3(CH_2)_7CH=CH(CH_2)_7COOH]$, α-alpha-linolenic acid $[CH_3CH_2CH=CHCH_2CH=CHCH_2CH=CH(CH_2)_7COOH]$, arachidonic acid $[CH_3(CH_2)_4CH=CHCH_2CH=CHCH_2CH=CHCH_2CH=CH(CH_2)_3COOH]$, eicosapentaenoic acid $[CH_3CH_2CH=CHCH_2CH=CHCH_2CH=CHCH_2CH=CHCH_2CH=CH(CH_2)_3COOH]$, erucic acid $[CH_3(CH_2)_7CH=CH(CH_2)_{11}COOH]$, docosahexaenoic acid $[CH_3CH_2CH=CHCH_2CH=CHCH_2CH=CHCH_2CH=CHCH_2CH=CHCH_2CH=CH(CH_2)_2COOH]$, stearic acid $[CH_3CH_2(CH_2)_{15}COOH)$, ricinoleic acid $[CH_3(CH_2)_5C(OH)HCH_2CH=CH(CH_2)_7COOH$, 2-ethylhexane acid, versatic acid, lauric acid, and fatty acids contained in natural oils such as coconut oil, tallow oil, soy bean oil, mixtures and combinations, thereof. Preferred are saturated fatty acids, more preferably stearic acid.

As used herein, the term "fatty acid" includes fatty acid derivatives, such as for example fatty acid anhydrides, or fatty acid esters suitable for the use in the present polyesters. For clarity, the terms "fatty acid" and/or "its corresponding anhydride" do not include fatty acid salts. Fatty acid salt is a bivalent metal salt of a fatty acid.

In the context of the present invention, the polyester may be prepared from a fatty acid salt. Preferably the fatty acid salt used for the preparation of the polyester is used in an amount of not more than 0.59 mol %, more preferably not more than 0.50 mol %, even more preferably not more than 0.40 mol %, most preferably not more than 0.30 mol %, for example not more than 0.2 mol %, for example not more than 0.1 mol % based on the polyester, for example the polyester is not prepared from a fatty acid salt.

In the context of the present invention, the (thermosetting powder coating) composition can have a fatty acid salt of not more than 0.59 mol %, more preferably not more than 0.50 mol %, even more preferably not more than 0.40 mol %, most preferably not more than 0.30 mol %, for example not more than 0.2 mol %, for example not more than 0.1 mol % based on the polyester, for example the (thermosetting powder coating) composition has no fatty acid salt.

In a preferred embodiment, the present invention relates to a polyester according to the invention, wherein the carboxylic acid functional branched polyester is prepared from at least the following monomers: a difunctional aromatic acid, the difunctional aromatic acid being a combination of terephthalic acid (TPA), isophthalic acid (IPA), an at least trifunctional monomer and a difunctional alcohol, the difunctional alcohol being a combination of at least ethylene glycol (EG) and/or diethylene glycol (DEG) and neopentyl glycol (NPG) and preferably wherein the carboxylic acid functional branched polyester is not prepared from a fatty acid salt, and wherein the molar ratio of TPA to IPA in the carboxylic acid functional branched polyester is at most 12.4, and the functionality of the carboxylic acid functional branched polyester is from 2.15 to 4.0, and the carboxylic acid functional branched polyester has an acid value of from 14 to 80 mg KOH/g resin, and the carboxylic acid functional branched polyester has a glass transition temperature of at least 40° C.

In another embodiment, the present invention relates to a polyester according to the invention wherein the carboxylic acid functional branched polyester is prepared from at least the following monomers: a difunctional aromatic acid, the difunctional aromatic acid being a combination of TPA, IPA, a fatty acid and/or its corresponding anhydride and/or its corresponding ester, an at least trifunctional monomer and a difunctional alcohol, the difunctional alcohol being a combination of at least EG and/or DEG and NPG and the amount of the fatty acid and/or its corresponding anhydride and/or its corresponding ester is from 0.5 to 5 mol % based on the carboxylic acid functional branched polyester.

The carboxylic acid functional branched polyester of the above embodiment when used in thermosetting powder coating compositions together with a crosslinker having oxirane groups and optionally an epoxy cure catalyst (in an amount of at least 0.3% w/w based on the polyester) and upon curing of said thermosetting powder coating compositions, affords low cost powder coatings which present enhanced corrosion resistance to steel substrates and in particular cold roll steel as well as good appearance and sufficient impact resistance. Furthermore, said low cost and corrosion resistant powder coatings may present good smoothness.

With an at least trifunctional monomer is meant that the monomer has at least three functional groups. For example, the at least trifunctional monomer may be chosen from the group of an at least trifunctional carboxylic acid, an at least trifunctional alcohol, an at least trifunctional hydroxycarboxylic acid and mixtures thereof.

An at least trifunctional carboxylic acid is a monomer having at least three functional 'carboxylic acid' groups. A carboxylic acid anhydride group should be counted as two 'carboxylic acid' groups. The sum of carboxylic acid groups should be at least three; for example a monomer having an anhydride group and a carboxylic acid group is, in the context of the present invention, a trifunctional carboxylic acid.

Examples of at least trifunctional carboxylic acids include but are not limited to trimellitic acid, trimellitic acid anhydride and pyromellitic acid. Preferably, if an at least trifunctional carboxylic acid or anhydride is used in the preparation of the polyester, trimellitic acid or trimellitic anhydride is used. In case a polyester having an acid value above 60 mgKOH/g polyester is prepared, trimellitic acid and/or trimellitic anhydride are particularly preferred.

An at least trifunctional hydroxycarboxylic acid is a monomer having both carboxylic acid (anhydride) and alcohol functional groups. The sum of 'carboxylic acid' and alcohol groups should be at least three. Also here, a carboxylic acid anhydride group is counted as two 'carboxylic acid' groups. An example of an at least trifunctional hydroxycarboxylic acid is dimethylolpropionic acid (DMPA).

An at least trifunctional alcohol is a monomer having at least three alcohol groups. An at least trifunctional alcohol may be used in the preparation of the polyester. Examples of at least trifunctional alcohols include glycerol, hexanetriol, trimethylol ethane, trimethylol propane, pentaerythritol and sorbitol. Preferably, if an at least trifunctional alcohol is used in the preparation of the polyester, trimethylolpropane is used.

The amount and choice of at least trifunctional monomer for the preparation of the polyester determines the functionality of the polyester. In the context of the context of the present invention, with functionality (f) of the polyester is meant the mean amount of carboxylic acid functional groups capable of reacting with oxirane groups per molecule of the polyester. The functionality f for the polyester having a certain $M_n$ (theoretical value) and acid value (AV), is calculated according to the following equation:

$$f=(M_n \times AV)/56110$$

Preferably the polyester has a functionality of at least 2.15, more preferably of at least 2.2, even more preferably of at least 2.25, for example of at least 2.3. For example, the polyester has functionality of at most of at most 4, for example of at most 3.5, for example of at most 3.0, for example of at most 2.8, for example of at most 2.75, for example of at most 2.65, for example of at most 2.6. For example, the polyester may have a functionality of from 2.15 to 4.0, for example, the polyester may have a functionality of from 2.3 to 3.0.

The number average molecular weight ($M_n$) is defined as follows:

$$M_n=(\Sigma_i N_i M_i)/(\Sigma_i N_i)$$

where $N_i$ is the number of molecules of molecular weight $M_i$.

The $M_n$ is calculated (theoretical value) using by multiplying the targeted functionality (f) with 56110 and dividing the outcome thereof by the targeted acid value (AV) (mg KOH/g of the polyester) according to the following equation:

$$M_n=(56110 \times f)/AV$$

The number average molecular weight ($M_n$) (theoretical value) of the polyester may be for example in the range from 1000 to 10000 g/mol. Preferably the $M_n$ of the polyester ranges from 1200 to 8000 g/mol and most preferably the $M_n$. of the polyester ranges from 1400 to 7500 g/mol.

Suitable alcohols, reactable with carboxylic acids to obtain a polyester include aliphatic diols. Suitable examples of alcohols include ethylene glycol (EG), propane-1,2-diol, propane-1,3-diol, butane-1,2-diol, butane-1,4-diol, butane-1,3-diol, 2,2-dimethylpropanediol-1,3 (=neopentyl glycol) (NPG), hexane-2,5-diol, hexane-1,6-diol, 2,2-bis-(4-hydroxy-cyclohexyl)-propane (hydrogenated bisphenol-A), 1,4-dimethylolcyclohexane, diethylene glycol (DEG), dipropylene glycol, 2,2-bis[4-(2-hydroxy ethoxy)-phenyl]propane, the hydroxy pivalic ester of neopentyl glycol, 2-ethyl, 2-butyl propanediol-1,3 (=butylethylpropane diol), 2-ethyl, 2-methyl propanediol-1,3 (=ethylmethylpropane diol).

The polyester according to the invention is prepared from a difunctional alcohol, wherein the difunctional alcohol is a combination of at least ethylene glycol and/or diethylene glycol and neopentyl glycol, for example a combination of at least ethylene glycol and neopentyl glycol, a combination of at least diethylene glycol and neopentyl glycol or a combination of at least ethylene glycol, diethylene glycol and neopentyl glycol.

The amount of NPG used for the preparation of the polyester of the invention generally ranges from 1 up to 99 mol % on the total amount of difunctional alcohols. Preferably the amount of NPG is at least 5 mol %, more preferably at least 8 mol % even more preferably at least 10 mol %, most preferably at least 15 mol %, for example at least 19 mol % on the total amount of difunctional alcohols used for the preparation of the polyester of the invention. Preferably the amount of NPG is at most 98 mol %, more preferably at most 96 mol % even more preferably at most 94 mol %, most preferably at most 92 mol %, for example at most 90 mol % for example at most 89 mol %, for example at most 80 mol %, for example at most 70 mol %, for example at most 65 mol %, for example at most 55 mol %, for example at most 45 mol %, for example at most 40 mol %, for example at most 36 mol % on the total amount of difunctional alcohols used for the preparation of the polyester of the invention.

The amount of difunctional alcohol other than NPG for example EG and/or DEG used for the preparation of the polyester of the invention generally ranges from 1 up to 99 mol % on the total amount of difunctional alcohols. Preferably the amount of difunctional alcohol other than NPG is at least 1 mol %, more preferably at least 2 mol % even more preferably at least 3 mol %, most preferably at least 5 mol %, for example at least 7 mol %, for example at least 9 mol %, for example at least 11 mol % on the total amount of difunctional alcohols (for clarity, including NPG) used for the preparation of the polyester of the invention. Preferably the amount of difunctional alcohol other than NPG is at most 98 mol %, more preferably at most 96 mol % even more preferably at most 94 mol %, most preferably at most 92 mol %, for example at most 90 mol % for example at most 89 mol %, for example at most 87 mol % for example at most 85 mol %, for example at most 83 mol % for example at most 81 mol %, for example at most 80 mol % on the total amount of difunctional alcohols used for the preparation of the polyester of the invention.

In another embodiment, the present invention relates to a polyester according to the invention, wherein
the amount of EG and/or DEG present in the carboxylic acid functional branched polyester is at least 1 mol % to at most 90 mol % on the total amount of difunctional alcohols present in the carboxylic acid functional branched polyester, and
the amount of NPG present in the carboxylic acid functional branched polyester is at least 10 mol % to at most 90 mol % on the total amount of difunctional alcohols present in the carboxylic acid functional branched polyester.

The % molar ratio of ethylene glycol to neopentyl glycol or the % molar ratio of diethylene glycol to neopentyl glycol if preferably from 1:1 to 6:1. More preferably, the % molar ratio of ethylene glycol to neopentyl glycol or the % molar ratio of diethylene glycol to neopentyl glycol is at least 2:1 and/or at most 5:1.

In another embodiment, the present invention relates to a polyester according to the invention, wherein
the molar ratio of TPA to IPA in the carboxylic acid functional branched polyester is at least 5.62 and at most 12.4, and
the amount of EG and/or DEG present in the carboxylic acid functional branched polyester is at least 11 mol % to at most 81 mol % on the total amount of difunctional alcohols present in the carboxylic acid functional branched polyester, and
the amount of NPG present in the carboxylic acid functional branched polyester is at least 19 mol % to at most 89 mol % on the total amount of difunctional alcohols present in the carboxylic acid functional branched polyester.

The carboxylic acid functional branched polyester of the above embodiment when used in thermosetting powder coating compositions together with a crosslinker having oxirane groups and optionally an epoxy cure catalyst (in an amount of at least 0.3% w/w based on the polyester) and upon curing of said thermosetting powder coating compositions, affords low cost powder coatings which present even better corrosion resistance to steel substrates and in particular cold roll steel as well as good appearance and sufficient impact resistance. Furthermore, said low cost and corrosion resistant powder coatings may present good smoothness.

In a preferred embodiment of the present invention, the difunctional alcohol is a combination of diethylene glycol, ethylene glycol and neopentyl glycol as this makes a commercially attractive combination of monomers.

For example, the amount of diethylene glycol present in the polyester is from 0.5 to 15 mol %, preferably from 0.5 to 10 mol %. For example, the amount of ethylene glycol is from 0.5 to 40 mol %. Preferably, the amount of ethylene glycol is a most 35 and/or preferably at least 5, more preferably at least 15 mol %. For example, the amount of neopentyl glycol is from 5 to 30 mol %. Preferably, the amount of neopentyl glycol is at least 6 mol % and/or preferably at most 25 mol %, for example at most 15 mol %.

Preferably, the polyester of the invention is prepared from the following monomers: trimethylolpropane, neopentyl glycol, ethylene glycol, diethylene glycol, terephthalic acid and/or its corresponding anhydride, isophthalic acid and/or its corresponding anhydride, stearic acid and/or its corresponding anhydride and optionally adipic acid and/or its corresponding anhydride, wherein the sum of the amount of these monomer adds up to 100 mol %.

The polyester may be prepared according to conventional procedures by esterification or transesterification, optionally in the presence of customary esterification catalysts for example dibutyltin oxide or tetrabutyl titanate.

The carboxylic acid functional polyester of the invention has an acid value of from 14 to 80 mg KOH/g polyester. Preferably, the carboxylic acid functional polyester has an acid value of at least 18 mg KOH/g polyester, more preferably of at least 20 mg KOH/g polyester, for example of at least 25 mg KOH/g polyester, for example of at least 30 mg KOH/g polyester. Preferably, the carboxylic acid functional polyester has an acid value of at most 77, more preferably of at most 76 mg KOH/g polyester, even more preferably of at most 75 mg KOH/g polyester.

The glass transition temperature ($T_g$) of the polyester is preferably at least 40° C., more preferably at least 45° C., even more preferably at least 50° C. The glass transition temperature ($T_g$) of the polyester is preferably at most 100° C., more preferably at most 90° C., even more preferably at most 80° C., most preferably at the most 70° C. Preferably, the polyester is amorphous, that is the polyester only has a glass transition temperature and does not have a melting temperature.

Glass transition temperature ($T_g$) and melting temperature ($T_m$) are determined in the context of the present invention using differential scanning calorimetry (DSC) on a Mettler Toledo, TA DSC821 by heating a sample of 10 mg from 20° C. to 150° C. at a heating rate of 40° C./minutes, keeping the sample at 150° C. for 15 minutes and subsequently cooling the sample down to 0° C. at a cooling rate of 40° C./min, keeping the sample at 0° C. for 30 seconds and reheating the sample to 200° C. at a heating rate of 5° C./min and recording the heat flow. The melting temperature of a crystalline material is recorded through the melting peak from the thermogram of the second heating. The glass transition temperature is determined from the step transition signal in the thermogram of the second heating as the temperature at which half height of the step transition occurs.

The polyester preferably has a viscosity at 160° C. of at most 150 Pa·s, more preferably the polyester has a viscosity of at most 125 Pa·s and most preferably the polyester has a viscosity of at most 100 Pa·s, for example the polyester has a viscosity of at most 80 Pa·s. Preferably, the polyester has a viscosity at 160° C. of at least 5 Pa·s, more preferably the polyester has a viscosity of at least 10 Pa·s, even more preferably the polyester has a viscosity of at least 19 Pa·s. The viscosity of the polyester is measured at 160° C. using as a cone and plate rheometer the Brookfield CAP 2000+, with spindle CAP-S-05 at 21 rpm (shear rate 70 s$^{-1}$).

In another aspect, the invention relates to a composition comprising the polyester according to the invention and an epoxy cure catalyst chosen from the group of quaternary ammonium salts, quaternary phosphonium salts, tertiary amines, tertiary phosphines and mixtures thereof. Suitable examples of epoxy cure catalysts include quaternary ammonium salts, such as for example octyltrimethyl ammonium halides, decyltrimethyl ammonium halides, dodecyltrimethyl ammonium halides, tetradecyltrimethyl ammonium halides, hexadecyltrimethyl ammonium halides, octadecyltrimethyl ammonium halides, didodecyldimethyl ammonium halides, ditetradecylmonomethyl ammonium halides, dihexadecylmonomethyl ammonium halides, ditallowalkylmonomethyl ammonium halides, trioctyl ammonium halides, tridecyl ammonium halides, tridodecyl ammonium halides or mixtures of any of them; quaternary phosphonium salts, such as for example dodecyltriphenyl phosphonium halides, decyltriphenyl phosphonium halides, octyldiphenyl phosphonium halides, trioctyl phosphonium halides, triphenylethylphosphoniumbromide (TRAP) or mixtures of any of them; tertiary amines, such as for example octyldimethylamine, decyldimethylamine, dodecyldimethylamine, tetradecyldimethylamine, hexadecyldimethylamine (also known as palmityldimethylamine), octadecyldimethylamine, didodecylmonomethylamine, ditetradecylmonomethylamine, dihexadecylmonomethylamine, di-tallow alkylmonomethylamine, (hydrogenated tallow alkyl)-dimethylamine, trioctylamine, tridecylamine, tridodecylamine or mixtures of any of them; and tertiary phosphines, such as for example dodecyldiphenylphosphine, decyldiphenylphosphine, octyldiphenylphosphine, trioctylphospine, triphenylphosphine or mixtures of any of them; and mixtures thereof.

As a halide counterion in the quaternary ammonium salt or in the quaternary phosphonium salt preferably bromide or chloride is used. The most commonly used epoxy cure catalysts are quaternary ammonium salts such as hexadecyltrimethylammonium bromide (CETAB) and quaternary phosphonium salts, such as triphenylethylphosphonium bromide (TRAP).

In a preferred embodiment, the present invention relates to a composition comprising the polyester according to the invention and an epoxy cure catalyst chosen from the group of quaternary ammonium salts, quaternary phosphonium salts, tertiary amines, tertiary phosphines and mixtures thereof, and wherein the composition does not comprise a fatty acid salt in an amount of more than 0.59 mol % based on the polyester of the invention.

The amount of epoxy cure catalyst that may be present in the composition generally ranges from 0.01 to 3% w/w based on the polyester. Preferably, the amount of epoxy cure catalyst that may be present in the composition is at least 0.02, more preferably at least 0.05, most preferably at least 0.1% w/w based on the polyester. Preferably, the amount of epoxy cure catalyst that may be present in the composition of the present invention is at most 2, more preferably at most 1, for example 0.6% w/w based on the polyester. For example, the amount of epoxy cure catalyst present in the composition is from 0.1 to 1.0% w/w based on the polyester.

In yet another aspect, the invention relates to a thermosetting powder coating composition, comprising a polyester according to the invention and a crosslinker comprising oxirane groups.

Examples of crosslinkers comprising oxirane groups (also known as epoxy crosslinkers) include bisphenol-A resins, bisphenol-F epoxy resins, glycidylesters, triglycidylisocyanurates and combinations thereof. It is preferred to use a glycidylester and even more preferred to use a bisphenol-A epoxy resin. Examples of commercially available bisphenol-A epoxy resins include Araldite® GT7004 (Huntsman), Epikote®1002 (Shell) and DER 663® (Dow).

Examples of commercially available glycidylesters include Araldite®PT910 and Araldite®PT912. Examples of triglycidylisocyanurates include TGIC, which is commercially available as Araldite®PT810.

The bisphenol epoxy resins can vary considerably in molecular weight. This is most often expressed as the epoxy equivalent weight (EEW). The epoxy equivalent weight is the weight of an epoxy resin containing exactly one mole of epoxy groups, expressed in g/mol. The EEW is not particularly critical; a suitable range is 150-1000. Preferably epoxies with an EEW of 300-900, more preferably 500-800 and most preferably 600-750 are used.

The weight ratio of the crosslinker comprising oxirane groups to the polyester in the thermosetting powder coating composition of the invention is preferably chosen between 15:85 and 50:50, for example a ratio between 30:70 and 40:60. The acid value of the polyester is typically chosen higher if more crosslinker comprising oxirane groups is used. For example in case a ratio of crosslinker comprising oxirane groups to the polyester is chosen to be 20:80, a polyester with an acid value of 20 mg KOH/g polyester may be used, for a ratio of 30:70, a polyester with an acid value of 35 may be used, for a ratio of 40:60, a polyester having an acid value of 52 may be used and for a ratio of 50:50, a polyester having an acid value of 75 may be used.

In another embodiment, the invention relates to a thermosetting powder coating composition wherein the thermosetting powder coating composition comprises the polyester of the invention and a crosslinker capable of reacting with the carboxylic acid groups on the carboxylic acid functional branched polyester, wherein
    the crosslinker comprises oxirane groups and
    the composition does not comprise a fatty acid salt in an amount of more than 0.59 mol % based on the carboxylic acid functional branched polyester.

In yet another embodiment, the invention relates to a thermosetting powder coating composition wherein the thermosetting powder coating composition comprises the polyester of the invention and a crosslinker capable of reacting with the carboxylic acid groups on the carboxylic acid functional branched polyester, wherein the crosslinker comprises oxirane groups and the thermosetting powder coating composition upon heat curing at 180° C. for 20 min, presents NSS corrosion resistance on cold roll steel of at most 7 mm from scribe after 480 hours as measured according to the method described in ISO 9227-2006, and the composition does not comprise a fatty acid salt in an amount of more than 0.59 mol % based on the carboxylic acid functional branched polyester.

In another embodiment, the invention relates to a thermosetting powder coating composition wherein the composition further comprises an oxirane cure catalyst chosen from the group of quaternary ammonium salts, quaternary phosphonium salts, tertiary amines, tertiary phosphines and mixtures thereof.

The glass transition temperature ($T_g$) of the uncured thermosetting powder coating composition is preferably at least 20° C., more preferably at least 25° C., even more preferably at least 35° C., most preferably at least 45° C. The glass transition temperature ($T_g$) of the uncured thermosetting powder coating composition is preferably at most 100° C., more preferably at most 90° C., even more preferably at most 80° C., most preferably at the most 70° C. In case in which the thermosetting powder compositions have a $T_g$ as well as a $T_m$, the $T_m$ is preferably at least 30° C., more preferably at least 40° C., even more preferably at least 45° C., most preferably at least 50° C. The $T_m$ of the uncured thermosetting powder coating composition is preferably at most 160° C., more preferably at most 140° C., even more preferably at most 120° C., most preferably at most 100° C. Glass transition temperature ($T_g$) and/or the $T_m$ of the uncured thermosetting powder coating composition is measured via temperature modulated DSC (MDSC). The measurement of $T_g$ and/or $T_m$ is performed by using a TA Instruments Q 2000 MDSC with a RCS2-90 cooling unit. Measurements are done in $N_2$ atmosphere and the MDSC apparatus is calibrated with indium, zinc and water. The software used for operating the MDSC and analyzing the thermograms is the Q-Series Advantage version 2.8.0394 from TA Instruments. A sample of approximately 10 mg sealed in aluminum DSC pans is heated up from 0° C. up to 200° C. at a heating rate of 5° C./min and an amplitude of temperature modulation of ±0.5° C. with a period of 40 s. The $T_g$ signal seen in the reversible heat flow is determined by using the analysis software.

As is apparent to the skilled person, besides the polyester, also other resins may be present in the thermosetting powder coating composition of the invention. If a mixture of polyesters is present in the thermosetting powder coating composition of the present invention, then preferably each polyester is independently prepared from at least the following monomers: neopentyl glycol, a difunctional alcohol other than neopentyl glycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof, wherein preferably the total amount of these monomers in the polyester is at least 90% w/w, preferably at least 93% w/w, more preferably at least 95% w/w, even more preferably at least 97% w/w, in particular at least 98% w/w, more in particular at least 99% w/w and most preferably 100% w/w based on the polyester.

Preferably, the amount of the polyester is at least 90% w/w, preferably at least 93% w/w, more preferably at least 95% w/w, even more preferably at least 97% w/w, in particular at least 98% w/w, more in particular at least 99% w/w and most preferably 100% w/w based on total amount of resins present in the thermosetting powder coating composition.

It is advantageous to use only the polyester in the thermosetting powder coating composition as the use of only one resin as opposed to a mixture of resins in a thermosetting powder coating composition is less laborious and economically more attractive.

The thermosetting powder coating composition according to the invention may further comprise waxes, pigments, fillers and/or the usual (processing) additives, for example degassing agents, smoothness, appearance enhancing agents or (light) stabilizers. The pigments may be inorganic or organic. Suitable inorganic pigments include for example, titanium dioxide, zinc sulphide, zinc phosphate, mica, iron oxide and/or chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194. Other additives, such as additives for improving tribo-chargeability may also be added.

(A part of) the usual additives, including the epoxy cure catalyst may be added after the polyester is synthesized, but before the polyester is discharged from the reactor. Alternatively, (part of) the additives may be added in the premix of the thermosetting powder coating composition as described above or in the extruder for instance by liquid injection.

In yet another aspect, the invention also relates to a process for the preparation of the thermosetting powder coating composition of the invention. The preparation of thermosetting powder coating compositions is described by Misev in "Powder Coatings, Chemistry and Technology" (pp. 224-300; 1991, John Wiley) hereby incorporated by reference. A common way to prepare a thermosetting powder coating composition is to mix the separately weight-out components in a premixer, heat the obtained premix, for example in a kneader, preferably in an extruder to obtain an extrudate, cool down the obtained extrudate until it solidifies and crush it into granules or flakes that are further grinded to reduce the particle size followed by appropriate classification to obtain a thermosetting powder coating composition of the right particle size. Therefore, the invention also relates to a process for the preparation of a thermosetting powder coating composition according to the invention comprising the steps of:

mixing the components of the thermosetting powder coating composition to obtain a premix heating the obtained premix, preferably in an extruder, to obtain an extrudate cooling down the obtained extrudate to obtain a solidified extrudate and breaking the obtained solidified extrudate into smaller particles to obtain the thermosetting powder coating composition and preferably classifying the thus prepared powder particles via a sieve and collect sieve fraction with particle size below 130 μm, preferably below 90 μm.

Preferably, the premix is heated to a temperature in the range of 80-130° C., more preferably in the range of 90-120° C. If the premix is heated in an extruder, it is preferred to use a temperature control in order to avoid too high temperatures that could lead to cure of the thermosetting powder coating composition in the extruder. Other means of controlling the temperature, especially in large extruders can be the control over the throughput, the feeding of the granulate, the screw geometry and speed.

In yet another aspect, the invention relates to a process for coating a substrate comprising the following steps:
1) applying a thermosetting powder coating composition according to the invention to a substrate such that the substrate is partially or fully coated with a coating.
2) heating the obtained partially or fully coated substrate for such time and to such temperature such that a coating is obtained that is at least partially cured.

The thermosetting powder coating composition of the present invention may be applied using the techniques known to the person skilled in the art, for example using electrostatic spray or electrostatic fluidized bed.

Heating of the coated substrate may be done using conventional methods, such as with a convection oven and/or with an IR lamp or with a flame spray gun.

The time during which the coating is at least partially cured is preferably below 60 minutes and usually above 1 minute in case a convection oven is used to heat the coating. More preferably, the cure time is below 40 minutes in case a convection oven is used to heat the coating. Curing temperatures are typically within the range of 160 to 220° C. For example, the curing time and temperature of a powder coating composition according to the invention may be 10 minutes at 180° C.

In another aspect, the invention relates to a powder coating prepared by partial or full cure of a composition according to the invention. The powder coating can be a primer, top coat or an intermediate coating, the latter playing for example the role of an interlayer adhesion promoter or that of a barrier coating.

The invention also relates to a substrate fully or partially coated with a composition according to the invention or with a powder coating according to the invention. In yet another aspect, the invention also relates to the use of the composition according to the invention to fully or partially coat a substrate.

Typical examples of substrates include steel substrates, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated.

In another aspect, the invention relates to the use of the polyester according to the invention in a powder coating to improve the corrosion resistance of a steel substrate coated with said powder coating.

In another aspect, the invention relates to the use of a composition according to the invention or of a powder coating according to the invention to improve the corrosion resistance of a steel substrate coated therewith.

In another aspect, the invention relates to the use of the composition according to the invention to fully or partially coat a substrate.

In another aspect, the invention relates to the a substrate according to the invention or use of the composition according to the invention to fully or partially coat a substrate, wherein the substrate is a steel substrate.

In another aspect, the invention relates to the use of a polyester according to the invention in a powder coating to improve the corrosion resistance of a steel substrate coated with said powder coating.

In another aspect, the invention relates to the use of a composition according to the invention or of a powder coating according to the invention to improve the corrosion resistance of a steel substrate coated therewith.

In yet another embodiment, the invention relates to the use of a polyester in a powder coating according to the invention, or of a composition according to the invention or of a powder coating according to the invention for automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defence applications (ballistic protection, body armor, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, whitegoods, furniture, computer housings, etc.), machinery applications (can and bottle handling machine parts, moving parts on weaving machines, bearings, gears, composite structures, ceramic structures, computer housings, etc.).

Yet, another aspect of the invention is a polyester chosen from the group of polyesters according to the Examples 3 to 8.

Yet, another aspect of the invention is a (thermosetting powder coating) composition chosen from the group of (thermosetting powder coating) compositions according to the Examples 11 to 16.

Yet, another aspect of the invention is a powder coating chosen from the group of powder coatings according to the Examples 19 to 24.

The invention will now be illustrated by way of the following examples without however being limited thereto.

EXAMPLES

In the Examples section, the abbreviation "Comp" denotes a Comparative Example of either a polyester e.g. CompPR1, or a thermosetting powder coating composition e.g. CompPCC1, or a powder coating e.g. CompPC1.

Analytical Methods and Techniques for the Measurement of the Properties of the Polyesters The measurement of the glass transition temperature ($T_g$) of the polyesters was carried out via differential scanning calorimetry (DSC) on a Mettler Toledo, TA DSC821, in $N_2$ atmosphere, calibrated with indium, zinc and water. The processing of the signal (DSC thermogramme, Heat Flow vs. Temperature) was carried out via STARe Software version 9.10 provided by Mettler Toledo A.G. A sample of 10 mg was heated from room temperature up to 150° C. at a heating rate of 40° C./min. As soon as the sample reached 150° C., temperature remained constant for 15 min. Subsequently, the sample was cooled down to 0° C. at a cooling rate of 40° C./min. After the sample reached 0° C. and keeping the sample in that temperature for 30 seconds, it was subsequently heated up to 200° C. at a heating rate of 5° C./min. At the glass transition temperature, a so called step transition is seen as the baseline shifts due to changes in thermal properties of the resin. This "step" is used to determine the $T_g$ of the polyester resin. The midpoint of this step in the thermogramme is calculated using the software supplied with the Mettler Toledo DSC apparatus and is defined as the $T_g$ of the polyester. The accuracy of the method is +/−0.5° C.

Viscosity measurements were carried out at 160° C., using as a cone and plate rheometer the Brookfield CAP 2000+ Viscometer, with spindle CAP-S-05 at 21 rpm (shear rate 70 s$^{-1}$).

The acid value (AV) (mg KOH/g of polyester) and hydroxyl value (OHV) (mg KOH/g of polyester) of the polyesters were measured titrimetrically according to ISO 2114-2000 and ISO 4629-1978, respectively.

The $T_g$, the viscosity, the AV and OHV were measured on the polyester without the addition of any additives.

The functionality (f) for a polyester of a certain $M_n$ (theoretical value) and a measured acid value (AV), was calculated according to the following equation:

$$f=(M_n \times AV)/56110$$

The $M_n$ (theoretical value) was calculated by multiplying the targeted functionality (f) with 56110 and dividing the outcome thereof by the measured acid value (AV) (mg KOH/g of the polyester) according to the following equation:

$$M_n=(56110 \times f)/AV$$

The theoretical values of the $M_n$ and f refer to the polyester without the addition of any additives.

Measurements and Assessment of Properties of the Powder Coatings

All the properties of the powder coatings were assessed using well defined cold-rolled steel Q-panels (R-46) from Q-Lab Corporation. These steel test panels are made from standard low-carbon, cold-rolled steel (CRS SAE 1008/1010) complying with ASTM A1008.1010, A-109, and QQS-698. The R-46 substrate is low-carbon cold roll steel and the dimensions of the panels are 102×152×0.8 mm (length× width×thickness); supplier Q-Lab Corporation. This type of panels is not an iron phosphated panel such as the Q-Phos™ from Q-Lab Corporation. The assessment of the powder coating properties was carried out on a powder coating that was cured at 180° C. for 20 minutes under atmospheric pressure (1 bar).

Coating thickness was measured by a PosiTector 6000 coating thickness gage from DeFelsko Corporation.

Reverse impact resistance (RIR) was tested according to ASTM D 2794, with a ⅝" ball, 1 day after the curing took place and at a film thickness of 75 μm for powder coatings CompPC1 and PC4 and at a film thickness of 60 micrometer for powder coatings PC2, PC3 and PC5-PC9. A 'Pass' in the row for RIR indicates that the coating could withstand the impact (showed no cracks or delamination) when the corresponding thermosetting powder coating composition was cured for 20 minutes at 180° C. A 'fail' indicates that the coating did not withstand the impact (showed cracks or delamination) when the corresponding thermosetting powder coating composition was cured for 20 minutes at 180° C.

Gloss and haze of the powder coatings with a film thickness of 60-75 μm derived upon full cure of the corresponding thermosetting powder coating compositions on R-46 panels, were measured according to ASTM D523 with a BYK-Gardner GmbH Haze-Gloss meter. The gloss is reported at angles of 20° and 60° in gloss units together with the measured haze.

Appearance of the coating is a visual inspection of the surface to check for defects like pinholes, craters and alike. A "good" in the row for appearance indicates that no obvious defects are seen and the coatings are useable. Otherwise, the appearance is indicated by the type of defects present such as for example "cratery", a coating that presented craters on its surface. The appearance of the powder coatings was assessed on powder coatings with film thickness of 60-75 μm. For the thermosetting powder coating compositions of the invention, good appearance is desirable.

Smoothness of powder coatings derived upon full cure of the corresponding thermosetting powder coating compositions was determined by comparing the smoothness of the coating with PCI Powder Coating Smoothness panels (ACT Test Panels Inc., APR22163 (A) Batch: 50708816) at a thickness of 60-75 μm. The rating of smoothness is from 1 to 10, with 1 representing the roughest coating and 10 representing the smoothest coating. For the thermosetting powder coating compositions of the invention, their corresponding powder coatings presenting smoothness equal or higher to 4, are desirable.

The corrosion resistance of the powder coatings of the thermosetting powder coating compositions was assessed via the Neutral Salt Spray test (NSS test). The NSS test was performed in accordance with ISO 9227-2006. In this test a scribe of 1 mm is carved along the coated R-46 panel until the bare metal is reached. The film thickness of the powder coatings was 60-70 μm. The scribe is located in the middle of the powder coated panel. The panels are then introduced in a salt spray chamber (Q—Fog cyclic corrosion tester, from Q-Lab) are placed facing upwards at an angle of 20°+/−5° from the vertical and an alkaline spray is created with a 5% (wt) NaCl water solution. After 480 hours at 35° C. (+/−1° C.) in the salt spray chamber, the panels (3 per sample) were removed from the chamber, dried and cleaned of rust; subsequently the width (mm) of the corrosion (creepage) along the scribe was measured (8 times per panel). The average creepage (mm) out of the three panels per powder coating tested (average out of 24 measurements per powder coating) was reported. The higher the value of the average creepage, the lower the corrosion resistance of the powder coating is.

Examples 1-8

Synthesis of the Polyesters

Examples 1 and 3

Synthesis of the Polyester CompPR1 and PR3: Monomers Used and General Procedure

The monomers and other components used for the preparation of polyesters CompPR1 and PR3 are described in Table 1.

A reactor vessel fitted with a thermometer, a stirrer and a distillation device was filled with a tin-based catalyst and all glycols under a nitrogen flow, as shown in Table 1. The vessel was heated up to 150° C. until the mixture was molten. Then, terephtalic acid was added and under a nitrogen flow the temperature was gradually increased to 260° C. while distilling of the reaction water until the acid number of the precursor of the polyester was below 20 mg KOH/g. The reaction mixture was cooled to 220° C. and subsequently the isophthalic acid together with either adipic acid or stearic acid was added for the second stage. The temperature was raised to 240-250° C. while distilling off water. In the final stage reduced pressure was applied until the polyester reached the desired acid number. Vacuum was stopped and the polyester was cooled down to 195° C. An amine containing tribo-charging agent (0.15% w/w based on the total weight of the polyester and the additives), a phosphonium salt [cure catalyst for compounds containing oxirane group(s)], 0.52% w/w based on the total weight of the polyester and the additives] and a flow agent 0.36% w/w based on the total weight of the polyester and the additives, were added and stirred for approximately 15-30 minutes to ensure a homogeneous mixture. Subsequently, the polyester was stirred for at least 20 minutes at 195° C. before discharging it onto an aluminum foil kept at room temperature.

Example 2

Synthesis of the Polyester CompPR2: Monomers Used and General Procedure

The monomers and other components used for the preparation of polyester CompPR2 are described in Table 1.

A reactor vessel fitted with a thermometer, a stirrer and a distillation device was filled with a tin-based catalyst and all glycols under a nitrogen flow, as shown in Table 1. The vessel was heated up to 150° C. until the mixture was molten. Then, terephtalic acid was added and under a nitrogen flow the temperature was gradually increased to 260° C. while distilling of the reaction water until the acid number of the precursor of the polyester was below 20 mg KOH/g. The reaction mixture was cooled to 220° C. and subsequently the isophtalic acid for the second stage was added. The temperature was raised to 240-250° C. while distilling off water. Reduced pressure was applied until the polyester reached the desired acid number. Subsequently, vacuum was stopped and the polyester was cooled down to 210° C. At this stage zinc stearate was added. Upon the addition of the zinc stearate the temperature was raised to 210° C. and it was maintained for 4 hours in order the zinc stearate to react while distilling off water. In the final stage reduced pressure was applied until the polyester reached the desired acid number. Vacuum was stopped and the polyester was cooled down to 195° C. An amine containing tribo-charging agent (0.15% w/w based on the total weight of the polyester and the additives), a phosphonium salt [cure catalyst for compounds containing oxirane group(s)], 0.35% w/w based on the total weight of the polyester and the additives] and a flow agent 0.36% w/w based on the total weight of the polyester and the additives, were added and stirred for approximately 15-30 minutes to ensure a homogeneous mixture. Subsequently, the polyester was stirred for at least 20 minutes at 195° C. before discharging it onto an aluminum foil kept at room temperature.

Examples 4-8

Synthesis of the Polyesters PR4-PR8: Monomers Used and General Procedure

The monomers and other components used for the preparation of polyesters PR4-PR8 are described in Table 1.

A reactor vessel fitted with a thermometer, a stirrer and a distillation device was filled with a tin-based catalyst and all glycols under a nitrogen flow, as shown in Table 1. The vessel was heated up to 150° C. until the mixture was molten. Then, terephtalic acid was added and under a nitrogen flow the temperature was gradually increased to 260° C. while distilling of the reaction water until the acid number of the precursor of the polyester was below 20 mg KOH/g. The reaction mixture was cooled to 220° C. and subsequently the isophthalic acid together with either adipic acid or stearic acid was added for the second stage. The temperature was raised to 240-250° C. while distilling off water. In the final stage reduced pressure was applied until the polyester reached the desired acid number. Vacuum was stopped and the polyester was cooled down to 195° C. An amine containing tribo-charging agent (0.15% w/w based on the total weight of the polyester and the additives), a phosphonium salt [cure catalyst for compounds containing oxirane group(s), 0.35% w/w based on the total weight of the polyester and the additives] and a flow agent 0.36% w/w based on the total weight of the polyester and the additives, were added and stirred for approximately 15-30 minutes to ensure a homogeneous mixture. Subsequently, the polyester was stirred for at least 20 minutes at 195° C. before discharging it onto an aluminum foil kept at room temperature.

The polyesters of Examples 1-8 are all carboxylic acid functional polyesters and all of them have a hydroxyl value (OHV) lower than 5 mg KOH/g carboxylic acid functional branched polyester.

TABLE 1

Composition and properties of the polyesters CompPR1, CompPR2 and PR3-PR8.

| | Ex. 1 | Ex. 2 | Ex. 3 | Ex. 4 | Ex. 5 | Ex. 6 | Ex. 7 | Ex. 8 |
|---|---|---|---|---|---|---|---|---|
| | | | | POLYESTER | | | | |
| | CompPR1 | CompPR2 | PR3 | PR4 | PR5 | PR6 | PR7 | PR8 |
| Monomers | | | | | | | | |
| Neopentyl glycol (g) | 342.87 | 93.24 | 79.56 | 341.45 | 369.91 | 169.71 | 140.64 | 93.24 |
| Trimethylolpropane (g) | 12.39 | 29.30 | 29.32 | 28.87 | 12.74 | 12.31 | 29.31 | 29.27 |
| Ethylene glycol (g) | 49.72 | 179.90 | 180.26 | — | — | 180.28 | 180.24 | 180.00 |
| Diethylene glycol (g) | — | 49.90 | 50.01 | 49.87 | 50.05 | — | — | 49.93 |
| Terephtalic acid (g) | 629.32 | 668.89 | 669.89 | 585.21 | 608.72 | 697.11 | 669.83 | 668.90 |
| Isophtalic acid (g) | 50.34 | 107.43 | 107.59 | 104.52 | 106.90 | 106.00 | 107.57 | 107.43 |
| Adipic acid (g) | 60.68 | — | — | — | — | — | — | — |
| Stearic acid (g) | — | — | 35.00 | 35.00 | — | — | 35.00 | 35.00 |
| Zinc stearate (g) | — | 35.00 | — | — | — | — | — | — |
| Phosphonium salt (g) [cure catalyst for compounds containing oxirane group(s)] | Yes | Yes | Yes | Yes | Yes | Yes | Yes | Yes |
| Neopentyl glycol (mol % on total of difunctional alcohols in the polyester) | 80.46 | 21.02 | 18.48 | 87.47 | 88.28 | 35.98 | 31.78 | 21.02 |
| Ethylene glycol (mol % on total of difunctional alcohols in the polyester) | 19.54 | 67.94 | 70.12 | 0.00 | 0.00 | 64.02 | 68.22 | 67.94 |

TABLE 1-continued

Composition and properties of the polyesters CompPR1, CompPR2 and PR3-PR8.

| | Ex. 1 | Ex. 2 | Ex. 3 | Ex. 4 | Ex. 5 | Ex. 6 | Ex. 7 | Ex. 8 |
|---|---|---|---|---|---|---|---|---|
| | | | | POLYESTER | | | | |
| | CompPR1 | CompPR2 | PR3 | PR4 | PR5 | PR6 | PR7 | PR8 |
| Diethylene glycol (mol % on total of difunctional alcohols in the polyester) | 0.00 | 11.04 | 11.40 | 12.53 | 11.72 | 0.00 | 0.00 | 11.04 |
| mol ratio TPA:IPA (= mol TPA/mol IPA) | 12.50 | 6.23 | 6.23 | 5.60 | 5.69 | 6.58 | 6.23 | 6.23 |
| Stearic acid (mol % present in the polyester) | 0.00 | 0.00 | 1.35 | 1.49 | 0.00 | 0.00 | 1.33 | 1.33 |
| Properties of the Polyester | | | | | | | | |
| $M_n$ (theoretical value) (g/mol) | 3666 | 3718 | 3697 | 3806 | 3863 | 3666 | 3676 | 3740 |
| Functionality (theoretical value) | 2.3 | 2.3 | 2.3 | 2.3 | 2.3 | 2.3 | 2.3 | 2.3 |
| $T_g$ (° C.) | 54 | 51 | 51 | 50 | 59 | 67 | 67 | 57 |
| Viscosity (Pa · s) @ 160° C. | 30 | 50 | 26 | 28 | 47 | 70 | 58 | 39 |
| AV (mg KOH/g of polyester) | 35 | 35 | 35 | 34 | 33 | 35 | 35 | 35 |

*does not contain specific monomer

Examples 9-16

Preparation of Thermosetting Powder Coating Compositions

Preparation of Thermosetting Powder Coating Compositions CompPCC1, CompPCC2 and PCC3-PCC8 based on polyesters CompPR1, CompPR2 and PR3-PR8: Chemicals Used and General Procedure The chemicals used to prepare the thermosetting powder coating compositions CompPCC1, CompPCC2 and PCC3-PCC8 in the following examples are described in Table 2. Araldite®GT7004 is a crosslinker from Huntsman, Kronos® 2310 is titanium dioxide from Kronos Titan GmbH, Resiflow® PV-88 is a flow control agent from Worlee-Chemie GmbH. Benzoin is used as degassing agent.

The thermosetting powder coating compositions were prepared by mixing the components presented in Table 2 in a blender, which components were subsequently extruded in a PRISM TSE16 PC twin screw at 115° C. with a screw speed of 200 rpm. The extrudate was allowed to cool to room temperature and broken into chips. These chips were then grinded in an ultra-centrifugal mill at 18000 rpm and sieved in a Retsch ZM100 sieve. The sieve fraction with particle size below 90 μm was collected and used for further experiments.

TABLE 2

Composition of thermosetting powder coating compositions CompPCC1, CompPCC2 and PCC3-PCC8.

| | Ex. 9 | Ex. 10 | Ex. 11 | Ex. 12 | Ex. 13 | Ex. 14 | Ex. 15 | Ex. 16 |
|---|---|---|---|---|---|---|---|---|
| | | | THERMOSETTING POWDER COATING COMPOSITION | | | | | |
| | Comp PCC1 | Comp PCC2 | PCC3 | PCC4 | PCC5 | PCC6 | PCC7 | PCC8 |
| Polyester & weight (g) | CompPR1 (210) | CompPR2 (210) | PR3 (210) | PR4 (210) | PR5 (210) | PR6 (210) | PR7 (210) | PR8 (210) |
| Crosslinker (ARALDITE GT 7004) (g) | 90 | 90 | 90 | 90 | 90 | 90 | 90 | 90 |
| Ratio of amount Polyester:amount Crosslinker | 70:30 | 70:30 | 70:30 | 70:30 | 70:30 | 70:30 | 70:30 | 70:30 |
| Kronos ® 2310 (g) | 150 | 150 | 150 | 150 | 150 | 150 | 150 | 150 |
| Resiflow ® PV 88 (g) | 4.5 | 4.5 | 4.5 | 4.5 | 4.5 | 4.5 | 4.5 | 4.5 |
| Benzoin (g) | 2.25 | 2.25 | 2.25 | 2.25 | 2.25 | 2.25 | 2.25 | 2.25 |

Examples 17-24

Preparation of Thermosetting Powder Coatings

Preparation of Powder Coatings CompPC1, CompPC2 and PC3-PC8 Based on the Thermosetting Powder Coating Compositions CompPCC1, CompPCC2 and PCC3-PCC8: General Procedure The Thermosetting Powder Coating Compositions CompPCC1, CompPCC2 and PCC3-PCC8 prepared in Examples 9-16 (Table 2) were electrostatically sprayed (corona, 60 kV) onto R-46 test panels to a coating thickness to suit each test mentioned herein and cured at 180° C. for 20 minutes in an air-circulation oven (Heraeus Instruments UT6120) affording white colored powder coatings.

TABLE 3

Properties of the powder coatings CompPC1, CompPC2 and PC3-PC8
derived upon cure of the thermosetting powder coating compositions CompPCC1,
CompPCC2 and PCC3-PCC8.

|  | Ex. 17 | Ex. 18 | Ex. 19 | Ex. 20 | Ex. 21 | Ex. 22 | Ex. 23 | Ex. 24 |
|---|---|---|---|---|---|---|---|---|
|  |  |  | POWDER COATING | | | | | |
|  | CompPC1 | CompPC2 | PC3 | PC4 | PC5 | PC6 | PC7 | PC8 |
| Corrosion Resistance [Neutral Salt Spray (NSS) test]: Average creepage (mm) from scribe | 9.2 | 1.4 | 2.8 | 2.4 | 1.9 | 1.6 | 1.5 | 1.5 |
| Appearance | Good | Cratery | Good | Good | Good | Good | Good | Good |
| RIR | Pass | Fail | Pass | Pass | Pass | Pass | Pass | Pass |
| Smoothness (PCI) | 5 | 6 | 4 | 5 | 4 | 4 | 4 | 5 |
| Gloss 20°/60° | 90/98 | 97/100 | 92/99 | 91/96 | 90/97 | 94/99 | 91/98 | 91/98 |
| Haze | 45 | 30 | 52 | 27 | 30 | 30 | 40 | 50 |

As can be seen from the Examples in Table 3 in combination with the Examples in Table 1:

a) Powder coatings that are low cost and that when subjected to the NSS test as described herein present average creepage lower than 7 mm from scribe and which have either a good appearance as defined herein or which present a RIR of 160 inch/lbs (curing conditions and film thickness as defined herein) can be prepared from a carboxylic acid functional branched polyester, wherein
the carboxylic acid functional branched polyester is prepared from at least the following monomers: a difunctional aromatic acid, the difunctional aromatic acid being a combination of terephthalic acid (TPA), isophthalic acid (IPA), an at least trifunctional monomer and a difunctional alcohol, the difunctional alcohol being a combination of at least ethylene glycol (EG) and/or diethylene glycol (DEG) and neopentyl glycol (NPG),
the molar ratio of TPA to IPA in the carboxylic acid functional branched polyester is at most 12.4, and
the functionality of the carboxylic acid functional branched polyester is from 2.15 to 4.0, and
the carboxylic acid functional branched polyester has an acid value of from 14 to 80 mg KOH/g carboxylic acid functional branched polyester, and
the carboxylic acid functional branched polyester has a glass transition temperature of at least 40° C.
This can be seen by comparing comparative examples CompPC1, CompPC2 with the examples according to the invention (PC3-PC8, Table 3 and taking into account their corresponding polyesters shown in Table 1).

b) Powder coatings that are low cost, which have good appearance as defined herein, and which present a RIR of 160 inch/lbs (curing conditions and film thickness as defined herein) and which when subjected to the NSS test as described herein present average creepage lower than 7 mm from scribe can be prepared from a carboxylic acid functional branched polyester wherein
the carboxylic acid functional branched polyester is prepared from at least the following monomers: a difunctional aromatic acid, the difunctional aromatic acid being a combination of terephthalic acid (TPA), isophthalic acid (IPA), a fatty acid and/or its corresponding anhydride, an at least trifunctional monomer and a difunctional alcohol, the difunctional alcohol being a combination of at least ethylene glycol (EG) and/or diethylene glycol (DEG) and neopentyl glycol (NPG) and
the amount of the fatty acid and/or its corresponding anhydride and/or its corresponding ester is from 0.5 to 5 mol % based on the carboxylic acid functional branched polyester and
the molar ratio of TPA to IPA in the carboxylic acid functional branched polyester is at most 12.4, and
the amount of EG and/or DEG present in the carboxylic acid functional branched polyester is at least 1 mol % to at most 90 mol % on the total amount of difunctional alcohols present in the carboxylic acid functional branched polyester, and
the amount of NPG present in the carboxylic acid functional branched polyester is at least 10 mol % to at most 90 mol % on the total amount of difunctional alcohols present in the carboxylic acid functional branched polyester.
the functionality of the carboxylic acid functional branched polyester is from 2.15 to 4.0, and
the carboxylic acid functional branched polyester has an acid value of from 14 to 80 mg KOH/g carboxylic acid functional branched polyester, and
the carboxylic acid functional branched polyester has a glass transition temperature of at least 40° C.
This can be seen by comparing the comparative Examples CompPC1 and PC2 with the examples of the invention (Examples PC3-PC8, Table 3 and taking into account their corresponding polyesters shown in Table 1).

c) Powder coatings that are low cost, which have good appearance as defined herein, which present a RIR of 160 inch/lbs (curing conditions and film thickness as defined herein) and which when subjected to the NSS test as described herein present average creepage lower than 2.2 mm from scribe can be prepared from a carboxylic acid functional branched polyester wherein
the carboxylic acid functional branched polyester is prepared from at least the following monomers: a difunctional aromatic acid, the difunctional aromatic acid being a combination of terephthalic acid (TPA), isophthalic acid (IPA), a fatty acid and/or its corresponding anhydride, an at least trifunctional monomer and a difunctional alcohol, the difunctional alcohol being a combination of at least ethylene glycol (EG) and/or diethylene glycol (DEG) and neopentyl glycol (NPG) and
the amount of the fatty acid and/or its corresponding anhydride and/or its corresponding ester is from 0.5 to 5 mol % based on the carboxylic acid functional branched polyester and the molar ratio of TPA to IPA in the carboxylic acid functional branched polyester is at least 5.62 and at most 12.4, and the amount of EG and/or DEG present in the carboxylic acid functional branched polyester is at least 11 mol % to at most 81 mol % on the total amount of difunctional alcohols present in the carboxylic acid functional branched polyester, and the amount of NPG present in the carboxylic acid functional branched polyester is at least 19 mol % to at most 89 mol % on the total amount of difunctional alcohols present in the carboxylic acid functional branched polyester.

the functionality of the carboxylic acid functional branched polyester is from 2.15 to 4.0, and the carboxylic acid functional branched polyester has an acid value of from 14 to 80 mg KOH/g carboxylic acid functional branched polyester, and the carboxylic acid functional branched polyester has a glass transition temperature of at least 40° C.

This can be seen by comparing Examples CompPC1, CompPC2, PC3, PC4 with Examples PC5-PC8 (Table 3) and taking into account their corresponding polyesters shown in Table 1.

d) Powder coatings that are low cost, which have good appearance as defined herein, which have smoothness of at least PCI 4, which present a RIR of 160 inch/lbs (curing conditions and film thickness as defined herein) and which when subjected to the NSS test as described herein present an average creepage lower than 1.6 mm from scribe can be prepared from a carboxylic acid functional branched polyester wherein the carboxylic acid functional branched polyester is prepared from at least the following monomers: a difunctional aromatic acid, the difunctional aromatic acid being a combination of terephthalic acid (TPA), isophthalic acid (IPA), a fatty acid and/or its corresponding anhydride, an at least trifunctional monomer and a difunctional alcohol, the difunctional alcohol being a combination of ethylene glycol (EG), diethylene glycol (DEG) and neopentyl glycol (NPG) and the amount of the fatty acid and/or its corresponding anhydride and/or its corresponding ester is from 0.5 to 5 mol % based on the carboxylic acid functional branched polyester and the molar ratio of TPA to IPA in the carboxylic acid functional branched polyester is at least 5.62 and at most 12.4, and the amount of EG and/or DEG present in the carboxylic acid functional branched polyester is at least 11 mol % to at most 81 mol % on the total amount of difunctional alcohols present in the carboxylic acid functional branched polyester, and the amount of NPG present in the carboxylic acid functional branched polyester is at least 19 mol % to at most 89 mol % on the total amount of difunctional alcohols present in the carboxylic acid functional branched polyester.

the functionality of the carboxylic acid functional branched polyester is from 2.15 to 4.0, and the carboxylic acid functional branched polyester has an acid value of from 14 to 80 mg KOH/g carboxylic acid functional branched polyester, and the carboxylic acid functional branched polyester has a glass transition temperature of at least 40° C.

This can be seen by comparing Examples CompPC1, CompPC2, PC3-PC6 with Examples PC7-PC8 (Table 3) taking into account their corresponding polyesters (Table 1).

Here it must be noted that even when a phosphonium salt (cure catalyst for compounds containing oxirane groups such as the crosslinker ARALDITE GT-7004) was present (powder coatings PC3-PC8), corrosion resistance and appearance were not compromised.

Comparative Example 2 shows that the teachings of JP 02092917 and JP 02099516 to use a fatty acid salt [JP 02099516, Example 3 (resin A-1-3) Table 1, Example 8 (resin A-3) Table 2] in the preparation of a polyester provides a thermosetting powder coating composition which upon curing the resulting powder coating is inferior to that of the present invention. More particularly, when zinc stearate (which is a fatty acid salt) was used in an amount of 0.60% mol on the total weight of the carboxylic acid functional branched polyester (=3.01% w/w on the total amount of the carboxylic acid functional branched polyester) to prepare a polyester (see Example 2), this afforded a powder coating (see Example 18) with inferior appearance and RIR as compared to any of the powder coatings PC3-PC8 (Examples 19-24) comprising the carboxylic acid functional branched polyester of the present invention (see Examples 3-8).

The invention claimed is:

1. A carboxylic acid functional branched polyester for thermosetting powder coating composition, wherein the carboxylic acid functional branched polyester is prepared from at least the following monomers: a difunctional aromatic acid, the difunctional aromatic acid being a combination of terephthalic acid (TPA), isophthalic acid (IPA), an at least trifunctional monomer and a difunctional alcohol, the difunctional alcohol being a combination of at least neopentyl glycol (NPG) with one or both of ethylene glycol (EG) and diethylene glycol (DEG), and a fatty acid salt in an amount from 0 to 0.59 mol % based on the carboxylic acid functional branched polyester, and the molar ratio of TPA to IPA in the carboxylic acid functional branched polyester is higher than 5 and at most 12.4, and the functionality of the carboxylic acid functional branched polyester is from 2.15 to 4.0, and the carboxylic acid functional branched polyester has an acid value of from 14 to 80 mg KOH/g carboxylic acid functional branched polyester, and the carboxylic acid functional branched polyester has a hydroxyl value less than 10 mg KOH/g carboxylic acid functional branched polyester; and the carboxylic acid functional branched polyester has a glass transition temperature of at least 40° C. and a viscosity at 160° C. of at most 125 Pa·s.

2. The carboxylic acid functional polyester according to claim 1, wherein the functionality of the carboxylic acid functional branched polyester is from 2.15 to 3.0.

3. The carboxylic acid functional polyester according to claim 2, wherein said polyester has a viscosity at 160° C. of at most 100 Pa·s.

4. The carboxylic acid functional polyester according to claim 2, wherein said polyester has a viscosity at 160° C. of at most 80 Pa·s.

5. The carboxylic acid functional branched polyester according to claim 1, wherein the functionality of said polyester is from 2.15 to 3.0 and wherein said polyester has a glass transition temperature of at most 90° C. and a Mn ranging from 1200 to 8000 g/mol.

6. The carboxylic acid functional polyester according to claim 5, wherein said polyester has a viscosity at 160° C. of at most 100 Pa·s.

7. The carboxylic acid functional polyester according to claim 5, wherein said polyester has a viscosity at 160° C. of at most 80 Pa·s.

8. The carboxylic acid functional polyester according to claim 1, wherein said polyester has a viscosity at 160° C. of at most 100 Pa·s.

9. The carboxylic acid functional polyester according to claim 1, wherein said polyester has a viscosity at 160° C. of at most 80 Pa·s.

10. The carboxylic acid functional branched polyester according to claim 1, wherein
the carboxylic acid functional branched polyester is prepared from at least the following monomers: a difunctional aromatic acid, the difunctional aromatic acid being a combination of TPA, IPA, a fatty acid and/or its corresponding anhydride and/or its corresponding ester, an at least trifunctional monomer and a difunctional alcohol, the difunctional alcohol being a combination of NPG with one or both of EG and DEG, and
the amount of the fatty acid and/or its corresponding anhydride and/or its corresponding ester is from 0.5 to 5 mol % based on the carboxylic acid functional branched polyester.

11. The carboxylic acid functional polyester according to claim 10, wherein the functionality of the carboxylic acid functional branched polyester is from 2.15 to 3.0.

12. The carboxylic acid functional polyester according to claim 11, wherein said polyester has a viscosity at 160° C. of at most 100 Pa·s.

13. The carboxylic acid functional branched polyester according to claim 10, wherein the functionality of said polyester is from 2.15 to 3.0 and wherein said polyester has a glass transition temperature of at most 90° C. and a Mn ranging from 1200 to 8000 g/mol.

14. The carboxylic acid functional polyester according to claim 13, wherein said polyester has a viscosity at 160° C. of at most 100 Pa·s.

15. The carboxylic acid functional polyester according to claim 10, wherein said polyester has a viscosity at 160° C. of at most 100 Pa·s.

16. The carboxylic acid functional branched polyester according to claim 10, wherein
the molar ratio of TPA to IPA in the carboxylic acid functional branched polyester is at least 5.62 and at most 12.4, and
the amount of EG and/or DEG present in the carboxylic acid functional branched polyester is at least 11 mol % to at most 81 mol % on the total amount of difunctional alcohols present in the carboxylic acid functional branched polyester, and
the amount of NPG present in the carboxylic acid functional branched polyester is at least 19 mol % to at most 89 mol % on the total amount of difunctional alcohols present in the carboxylic acid functional branched polyester.

17. The carboxylic acid functional polyester according to claim 16, wherein the functionality of the carboxylic acid functional branched polyester is from 2.15 to 3.0.

18. The carboxylic acid functional polyester according to claim 17, wherein the polyester has a viscosity at 160° C. of at most 100 Pa·s.

19. The carboxylic acid functional branched polyester according to claim 16, wherein the functionality of said polyester is from 2.15 to 3.0 and wherein the polyester has a glass transition temperature of at most 90° C. and a Mn ranging from 1200 to 8000 g/mol.

20. The carboxylic acid functional polyester according to claim 19, wherein the polyester has a viscosity at 160° C. of at most 100 Pa·s.

21. The carboxylic acid functional polyester according to claim 16, wherein the polyester has a viscosity at 160° C. of at most 100 Pa·s.

22. The carboxylic acid functional branched polyester according to claim 1, wherein
the molar ratio of TPA to IPA in the carboxylic acid functional branched polyester is at least 5.62 and at most 12.4, and
the amount of EG and/or DEG present in the carboxylic acid functional branched polyester is at least 11 mol % to at most 81 mol % on the total amount of difunctional alcohols present in the carboxylic acid functional branched polyester, and
the amount of NPG present in the carboxylic acid functional branched polyester is at least 19 mol % to at most 89 mol % on the total amount of difunctional alcohols present in the carboxylic acid functional branched polyester.

23. The carboxylic acid functional polyester according to claim 22, wherein the functionality of the carboxylic acid functional branched polyester is from 2.15 to 3.0.

24. The carboxylic acid functional polyester according to claim 23, wherein said polyester has a viscosity at 160° C. of at most 100 Pa·s.

25. The carboxylic acid functional branched polyester according to claim 22, wherein the functionality of said polyester is from 2.15 to 3.0 and wherein said polyester has a glass transition temperature of at most 90° C. and a Mn ranging from 1200 to 8000 g/mol.

26. The carboxylic acid functional polyester according to claim 25, wherein said polyester has a viscosity at 160° C. of at most 100 Pa·s.

27. The carboxylic acid functional polyester according to claim 22, wherein said polyester has a viscosity at 160° C. of at most 100 Pa·s.

28. The carboxylic acid functional branched polyester according to claim 1, wherein the difunctional alcohol is a combination of EG, DEG and NPG.

29. A composition comprising a carboxylic acid functional branched polyester according to claim 1 and an epoxy cure catalyst selected from the group consisting of quaternary ammonium salts, quaternary phosphonium salts, tertiary amines, tertiary phosphines and mixtures thereof, and wherein the composition does not comprise a fatty acid salt in an amount of more than 0.59 mol % based on the carboxylic acid functional branched polyester.

30. A thermosetting powder coating composition comprising a carboxylic acid functional branched polyester according to claim 1 and a crosslinker capable of reacting with the carboxylic acid groups on the carboxylic acid functional branched polyester, wherein
the crosslinker comprises oxirane groups and
the composition does not comprise a fatty acid salt in an amount of more than 0.59 mol % based on the carboxylic acid functional branched polyester.

31. The composition according to claim 30, wherein the composition further comprises an epoxy cure catalyst chosen from the group of quaternary ammonium salts, quaternary phosphonium salts, tertiary amines, tertiary phosphines and mixtures thereof.

32. The composition according to claim 31, wherein the functionality of the polyester is from 2.15 to 3.0, and the polyester has a viscosity at 160° C. if at most 80 Pa·s.

33. The composition according to claim 31, wherein the functionality of the polyester is from 2.15 to 3.0, and wherein the polyester has a glass transition temperature of at most 90° C., a $M_n$ ranging from 1200 to 8000 g/mol, and a viscosity at 160° C. if at most 100 Pa·s.

34. The composition according to claim 31, wherein
the carboxylic acid functional branched polyester is prepared from at least the following monomers: a difunctional aromatic acid, the difunctional aromatic acid being a combination of TPA, IPA, a fatty acid and/or its corresponding anhydride and/or its corresponding ester, an at least trifunctional monomer and a difunctional alcohol, wherein
the difunctional alcohol is a combination of EG, DEG and NPG, and
the amount of the fatty acid and/or its corresponding anhydride and/or its corresponding ester is from 0.5 to 5 mol % based on the carboxylic acid functional branched polyester,
the molar ratio of TPA to IPA in the carboxylic acid functional branched polyester is at least 5.62 and at most 12.4, and
the amount of EG and/or DEG present in the carboxylic acid functional branched polyester is at least 11 mol % to at most 81 mol % on the total amount of difunctional alcohols present in the carboxylic acid functional branched polyester, and
the amount of NPG present in the carboxylic acid functional branched polyester is at least 19 mol % to at most 89 mol % on the total amount of difunctional alcohols present in the carboxylic acid functional branched polyester, and
the polyester has a viscosity at 160° C. of at most 100 Pa·s.

35. The carboxylic acid functional branched polyester according to claim 2, wherein the difunctional alcohol is a combination of EG, DEG and NPG.

36. The carboxylic acid functional branched polyester according to claim 5, wherein the difunctional alcohol is a combination of EG, DEG and NPG.

37. The carboxylic acid functional branched polyester according to claim 8, wherein the difunctional alcohol is a combination of EG, DEG and NPG.

38. The carboxylic acid functional branched polyester according to claim 9, wherein the difunctional alcohol is a combination of EG, DEG and NPG.

39. The carboxylic acid functional branched polyester according to claim 3, wherein the difunctional alcohol is a combination of EG, DEG and NPG.

40. The carboxylic acid functional branched polyester according to claim 4, wherein the difunctional alcohol is a combination of EG, DEG and NPG.

41. The carboxylic acid functional branched polyester according to claim 6, wherein the difunctional alcohol is a combination of EG, DEG and NPG.

42. The carboxylic acid functional branched polyester according to claim 7, wherein the difunctional alcohol is a combination of EG, DEG and NPG.

43. The carboxylic acid functional branched polyester according to claim 14, wherein the difunctional alcohol is a combination of EG, DEG and NPG.

44. The carboxylic acid functional branched polyester according to claim 26, wherein the difunctional alcohol is a combination of EG, DEG and NPG.

45. The carboxylic acid functional branched polyester according to claim 20, wherein the difunctional alcohol is a combination of EG, DEG and NPG.

46. A composition comprising a carboxylic acid functional branched polyester according to claim 6 and an epoxy cure catalyst chosen from the group of quaternary ammonium salts, quaternary phosphonium salts, tertiary amines, tertiary phosphines and mixtures thereof, and wherein the composition does not comprise a fatty acid salt in an amount of more than 0.59 mol % based on the carboxylic acid functional branched polyester.

47. A composition comprising a carboxylic acid functional branched polyester according to claim 14 and an epoxy cure catalyst chosen from the group of quaternary ammonium salts, quaternary phosphonium salts, tertiary amines, tertiary phosphines and mixtures thereof, and wherein the composition does not comprise a fatty acid salt in an amount of more than 0.59 mol % based on the carboxylic acid functional branched polyester.

48. A composition comprising a carboxylic acid functional branched polyester according to claim 45 and an epoxy cure catalyst chosen from the group of quaternary ammonium salts, quaternary phosphonium salts, tertiary amines, tertiary phosphines and mixtures thereof, and wherein the composition does not comprise a fatty acid salt in an amount of more than 0.59 mol % based on the carboxylic acid functional branched polyester.

49. A powder coating prepared by partial or full cure of a composition according to claim 29.

50. A powder coating prepared by partial or full cure of a composition according to claim 46.

51. A powder coating prepared by partial or full cure of a composition according to claim 47.

52. A powder coating prepared by partial or full cure of a composition according to claim 48.

53. A powder coating prepared by partial or full cure of a composition according to claim 30.

54. A powder coating prepared by partial or full cure of a composition according to claim 31.

55. A powder coating prepared by partial or full cure of a composition according to claim 32.

56. A powder coating prepared by partial or full cure of a composition according to claim 33.

57. A powder coating prepared by partial or full cure of a composition according to claim 34.

58. A substrate fully or partially coated with a composition according to claim 29.

59. A substrate fully or partially coated with a composition according to claim 30.

60. A substrate fully or partially coated with a powder coating according to claim 49.

61. A substrate fully or partially coated with a powder coating according to claim 53.

* * * * *